United States Patent [19]

Katz et al.

[11] Patent Number: 5,230,055
[45] Date of Patent: Jul. 20, 1993

[54] BATTERY OPERATED COMPUTER OPERATION SUSPENSION IN RESPONSE TO ENVIRONMENTAL SENSOR INPUTS

[75] Inventors: Neil A. Katz, Parkland; Richard F. Pollitt, Highland Beach; Leopoldo L. Suarez, Boca Raton, all of Fla.; C. William Frank, Irvine, Calif.

[73] Assignee: International Business Machines Corporation, Armonk, N.Y.

[21] Appl. No.: 646,304

[22] Filed: Jan. 25, 1991

[51] Int. Cl.$^5$ .............................................. G06F 11/00
[52] U.S. Cl. ..................... 395/750; 364/557; 371/14
[58] Field of Search .................. 364/550, 551.01, 707, 364/557, 556, 492; 371/14, 66; 340/584, 602, 636; 395/750

[56] References Cited

U.S. PATENT DOCUMENTS

| | | | |
|---|---|---|---|
| 4,823,290 | 4/1989 | Fasack et al. | 364/550 |
| 4,884,242 | 11/1989 | Lacy et al. | 371/66 |
| 4,907,150 | 3/1990 | Arroyo et al. | 364/200 |
| 4,907,183 | 3/1990 | Tanaka | 364/707 |
| 5,012,406 | 4/1991 | Martin | 364/DIG. 1 |
| 5,021,983 | 6/1991 | Nguyen et al. | 371/66 |
| 5,025,387 | 6/1991 | Frane | 395/750 |
| 5,027,294 | 6/1991 | Fakruddin et al. | 364/550 |
| 5,041,964 | 8/1991 | Cole et al. | 395/425 |
| 5,056,092 | 10/1991 | Bruner | 371/14 |

*Primary Examiner*—Thomas G. Black
*Assistant Examiner*—Michael Zanelli
*Attorney, Agent, or Firm*—Martin J. McKinley

[57] ABSTRACT

A battery operated portable personal computer includes ambient temperature (46) and humidity (48) sensors, as well as two LCD's (52) to provide visual indication that the ambient temperature or humidity is out of range. If the ambient temperature drops below 3 degrees C., or if it rises above 52 degrees C., the computer enters a low power suspend mode wherein the computer is inoperable, but, upon switching from the suspend mode to the resume (operating) mode, the application program that was running at the time of the suspension is resumed at the same point that the suspension occurred. The LCD temperature indicator is activated when the ambient temperature drops below 3 degrees C., or rises above 46 degrees C. Thus, for high temperatures, the temperature indicator is activated 6 degrees before the computer is placed in the suspend mode. The ambient temperature is periodically monitored while in the suspend mode and, if the temperature rises above 6 degrees C., or drops below 44 degrees C., the computer switches from suspend to resume. Thus, hysteresis is provided to prevent the computer from oscillating between suspend and resume modes. If the humidity rises above 96% relative humidity, the computer enters the suspend mode and the LCD humidity indicator is activated. The ambient humidity is periodically monitored in the suspend mode and, if it drops below 87% relative humidity, the computer switches from suspend to resume mode.

12 Claims, 6 Drawing Sheets

BATTERY OPERATED COMPUTER OPERATION SUSPENSION IN RESPONSE TO ENVIRONMENTAL SENSOR INPUTS

BACKGROUND OF THE INVENTION

This invention pertains to personal computers an particularly, to a battery operated personal computer having temperature and humidity environmental sensors and means for suspending the operation of the computer in the event that ambient temperature or humidity parameters exceed predetermined limits.

Most personal computers have elements that are sensitive to extreme temperatures and excessive humidity, and damage to these elements can result if these environmental parameters exceed certain limits. For example, high temperatures can be detrimental to a hard disk drive by reducing relative humidity, and low relative humidity causes excessive disk media wear. For floppy disk drive operation, high temperatures can cause deformation of the diskette jacket, which may prevent the diskette media from spinning. Low temperatures can result in the condensation of moisture in a hard disk drive, which causes accelerated wear of the disk media at the "landing zone" of the head. In floppy disk drives low temperatures cause reduced head loading times, which may cause read/write errors. High relative humidity, on the other hand, only effects the operation of a hard disk drive if the disk drive is not a sealed unit. If the hard disk drive is not sealed, high relative humidity causes condensation, which, as discussed above, causes accelerated media wear in the landing zone. For floppy disk drives, high relative humidity reduces drive motor torque which, in turn, may prevent the motor from spinning.

This sensitivity of the hard disk drive and floppy disk drive to environmental factors is generally not a significant issue with most AC powered personal computers, which are typically operated in an office or home wherein environmental conditions are usually regulated. Because of their mobility however, battery operated portable personal computers are frequently operated in "hostile" environments, wherein ambient temperature and humidity factors may exceed the manufacturers recommended operating ranges.

In addition, battery operated portable personal computers include additional elements that are sensitive to environmental conditions. For example, the batteries and the liquid crystal displays (LCD's) typically used in these computers can be damaged when environmental temperatures exceed certain limits. Furthermore, LCD's have a low temperature limit beyond which they will not operate. Accordingly, the invention described below provides a means for suspending the operation of a personal computer when environmental conditions exceed certain limits, and for resuming computer operations when these environmental conditions return within safe limits.

DESCRIPTION OF THE PREFERRED EMBODIMENT

Figure 1:
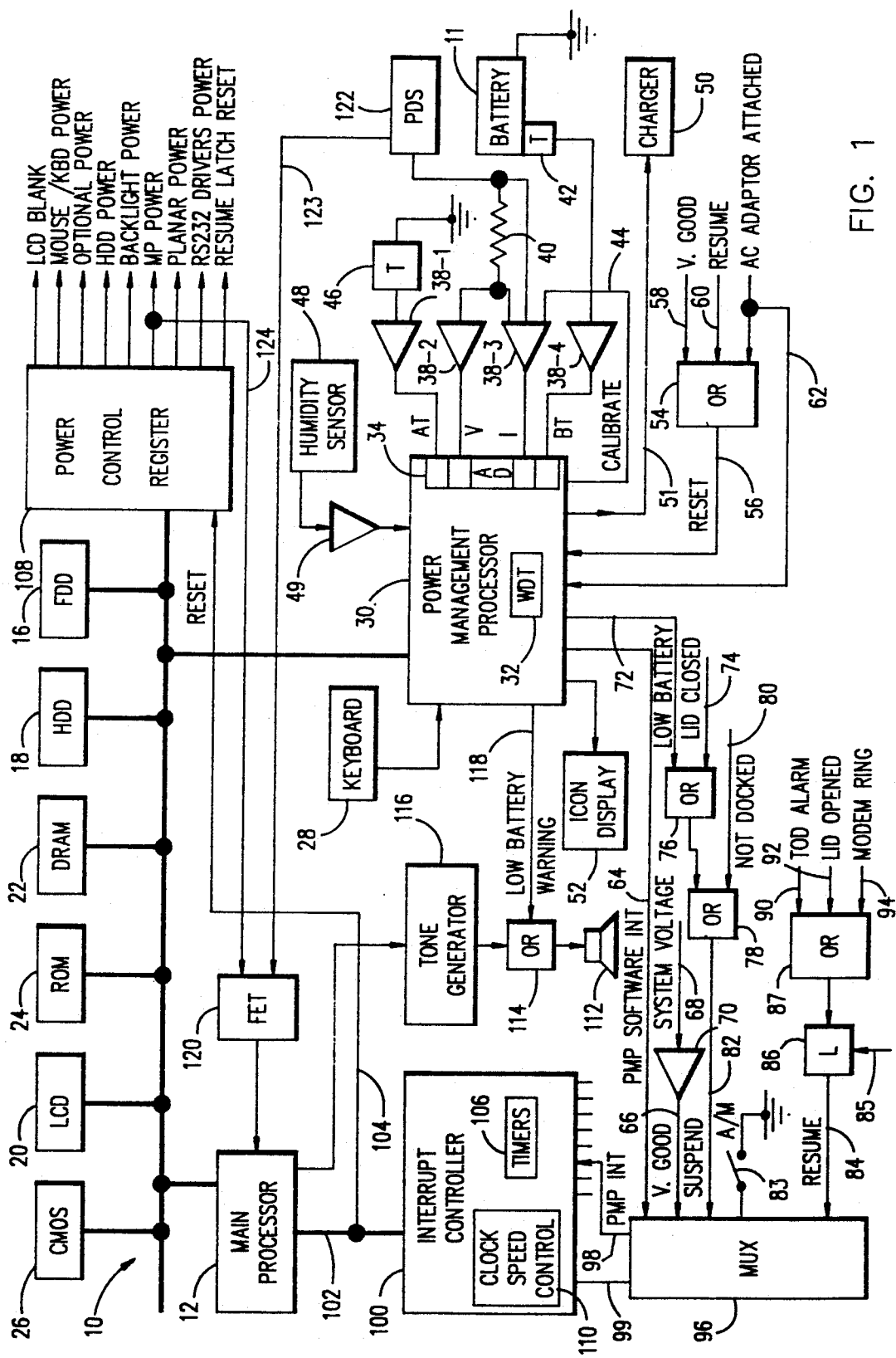
FIG. 1 is a block diagram of the battery operated portable personal computer of the present invention including temperature and humidity sensors and means for suspending and resuming computer operations.

FIG. 1 is a block diagram of a battery operated portable personal computer including temperature and humidity environmental sensors, and means for suspending the operation of the computer when these environmental parameters exceed predetermined limits. FIG. 1 is more fully described in a copending application entitled "Battery Operated Computer Power Management System", Ser. No. 071,647,118 which was filed on the same day as this application is and which is wholly incorporated by reference herein. Referring to this figure, a temperature sensor 46 and a humidity sensor 48 are connected to a low power CMOS microcontroller 30 through interface circuits 38-1 and 49, respectively. Interface circuits 38-1 and 49 are illustrated in more detail in FIGS. 2 and 3, respectively. Microcontroller 30 is connected to an address/data bus 10, which, in turn, is connected to a read only memory (ROM) 24. The programs to be described later may be stored in ROM 24 and in the onboard ROM in microcontroller 30. In addition, a main microprocessor 12 is also connected to address data bus 10. The Power On Self Test (POST) program to be described later is stored in ROM 24 and is executed by main processor 12.

Figure 2:
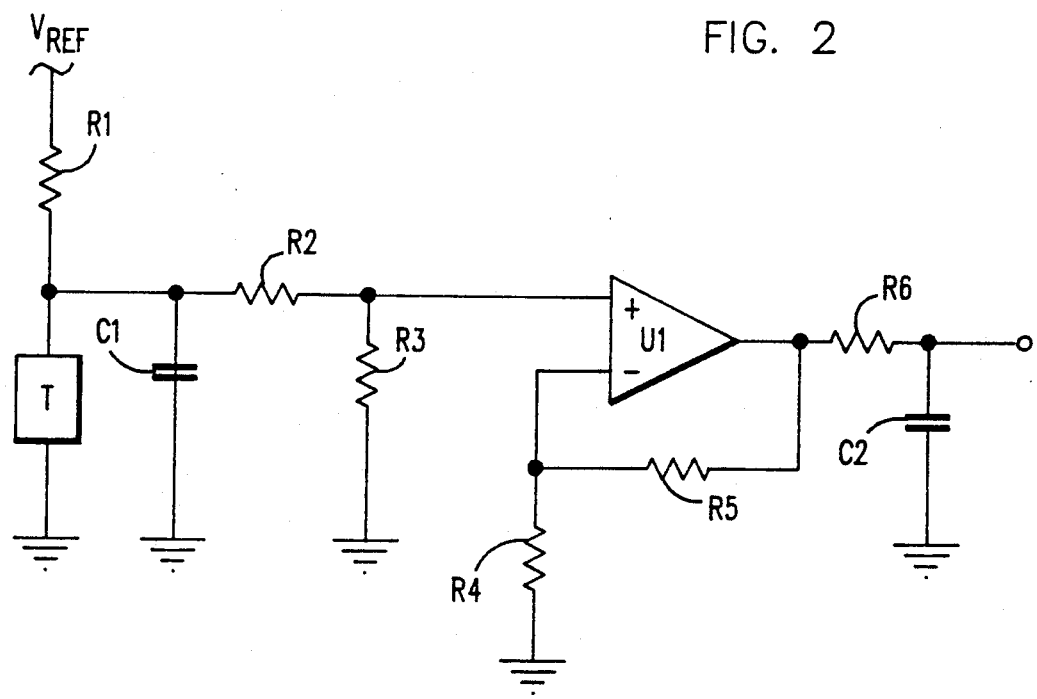
FIG. 2 is a schematic diagram of the interface circuit between the thermistor and the microprocessor.

FIG. 2 is a detailed schematic diagram of interface circuit 38-1, which couples the thermistor 46 to microcontroller 30. Referring to this figure, the preferred values for resistors are R1-R6 are as follows: 8K, 499K, 1M, 499K, 1M, and 1K Ohms respectively. Capacitors C1 and C2 are preferably 0.1 micro-Farad capacitors. Operational amplifier U1 is preferably one section of a well known LM324AM op amp. Thermistor T is preferably a type AT-2 thermistor having a nominal resistance of 10K Ohms at 25 degrees C. The tolerance of this resistor is plus or minus one percent, and its thermal time constant is 15 seconds. The overall voltage gain of this circuit is approximately unity. Resistor R1 is connected to a regulated voltage source $V_{ref}$. The output of this circuit is connected to an input port of microcontroller 30 that includes an internal analog to digital convertor. The thermistor T is mounted above the main circuit board in the battery operated portable computer so that its resistance essentially tracks the ambient temperature. The output of the circuit at the junction of R6 and C2 is a voltage that tracks the resistance of thermistor T, which, in turn, tracks the ambient temperature. This voltage at the output of the circuit is then converted by the analog digital convertor 34 in microcontroller 30. Then, passed to the environmental sensor programs described later.

Figure 3:
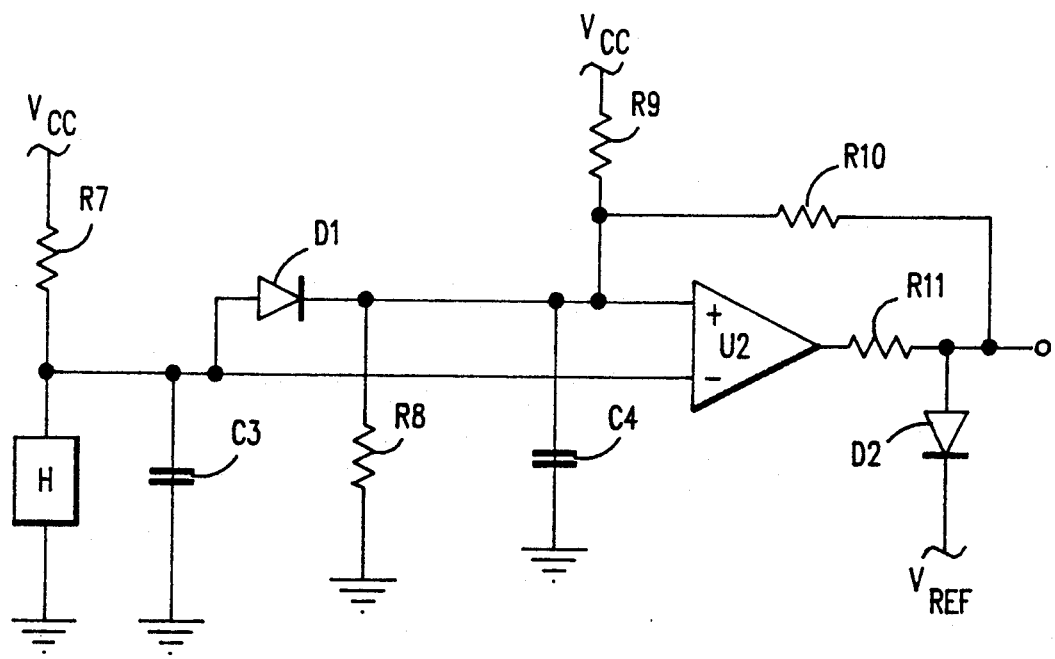
FIG. 3 is a schematic diagram of the interface circuit between the humidity sensor and the microprocessor.

FIG. 3 is a schematic diagram of the interface circuit 49 that interconnects the humidity sensor 48 to the microcontroller 30. Referring to this figure, resistors R7-R11 have the following preferred values: 210K, 2.49K, 100K, 10K, and 20.5K Ohms, respectively. Capacitor C3 and C4 are preferably 0.1 micro-Farad capacitors. Diode D1 interconnects humidity sensor H to the non-inverting input of op amp U2. Diode D2 is interconnected between the output of the humidity interface circuit 49 and the reference voltage source $V_{ref}$ described above. One end of resistors R7 and R9 is connected the battery voltage $V_{cc}$. Operational amplifier U2 is preferably one section of a well known LM324AM op amp. Humidity sensor H is preferably a hygroscopic resin, carbon composition film on an aluminum substrate. The characteristics of humidity sensor H and interface circuit 49 are illustrated in more detail in FIG. 4.

Figure 4:
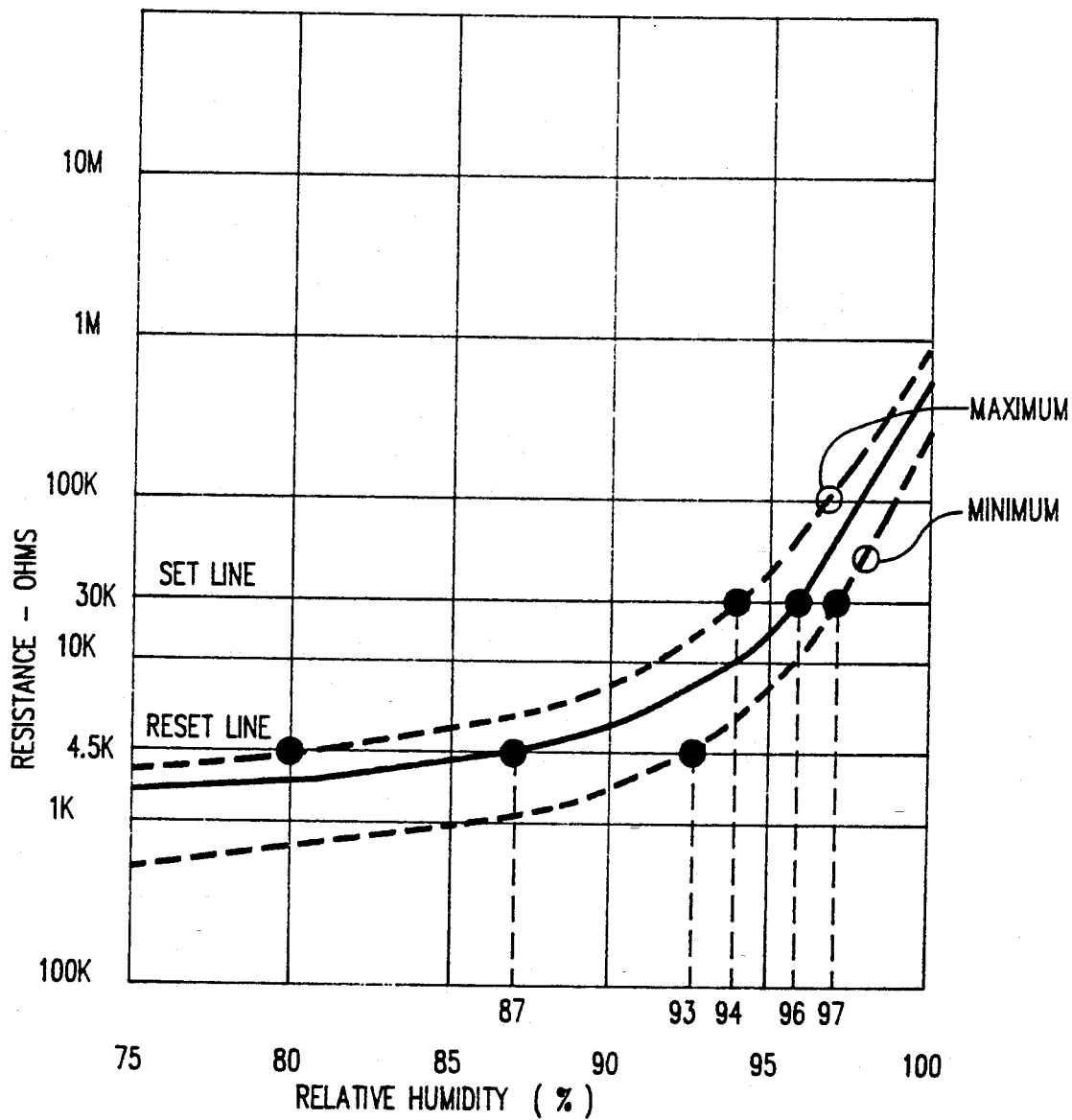
FIG. 4 is a graph of relative humidity vs. resistance that illustrates the response of the relative humidity sensor.

Referring to FIG. 4, the solid curve on the graph represents the nominal performance of the humidity sensor H, while the dotted lines indicated its minimum and maximum resistance as a function of relative humidity. Interface circuit 49, which is illustrated in more detail in FIG. 3, is a hysteresis circuit having a binary output. The "set line" in the graph indicates the point in the curve that the resistance of the relative humidity indicator must exceed before the output of the circuit switches from a logic zero to a logic one. Similarly, the "reset line" indicates the point at which the resistance of the relative humidity sensor H must drop below before the output of the interface circuit switches from a logic one to a logic zero. The corresponding values of relative humidity are indicated on the horizontal axis of the graph. Note that the output of the interface circuit switches from a zero to a one when the relative humidity exceeds a nominal value of 96% RH. Similarly, the output of the interface circuit switches from a logic one to a logic zero when the nominal value of the relative humidity drops below 87% RH. Thus, the interface circuit builds in a nominal hysteresis value of approximately thirteen RH.

Figure 5:
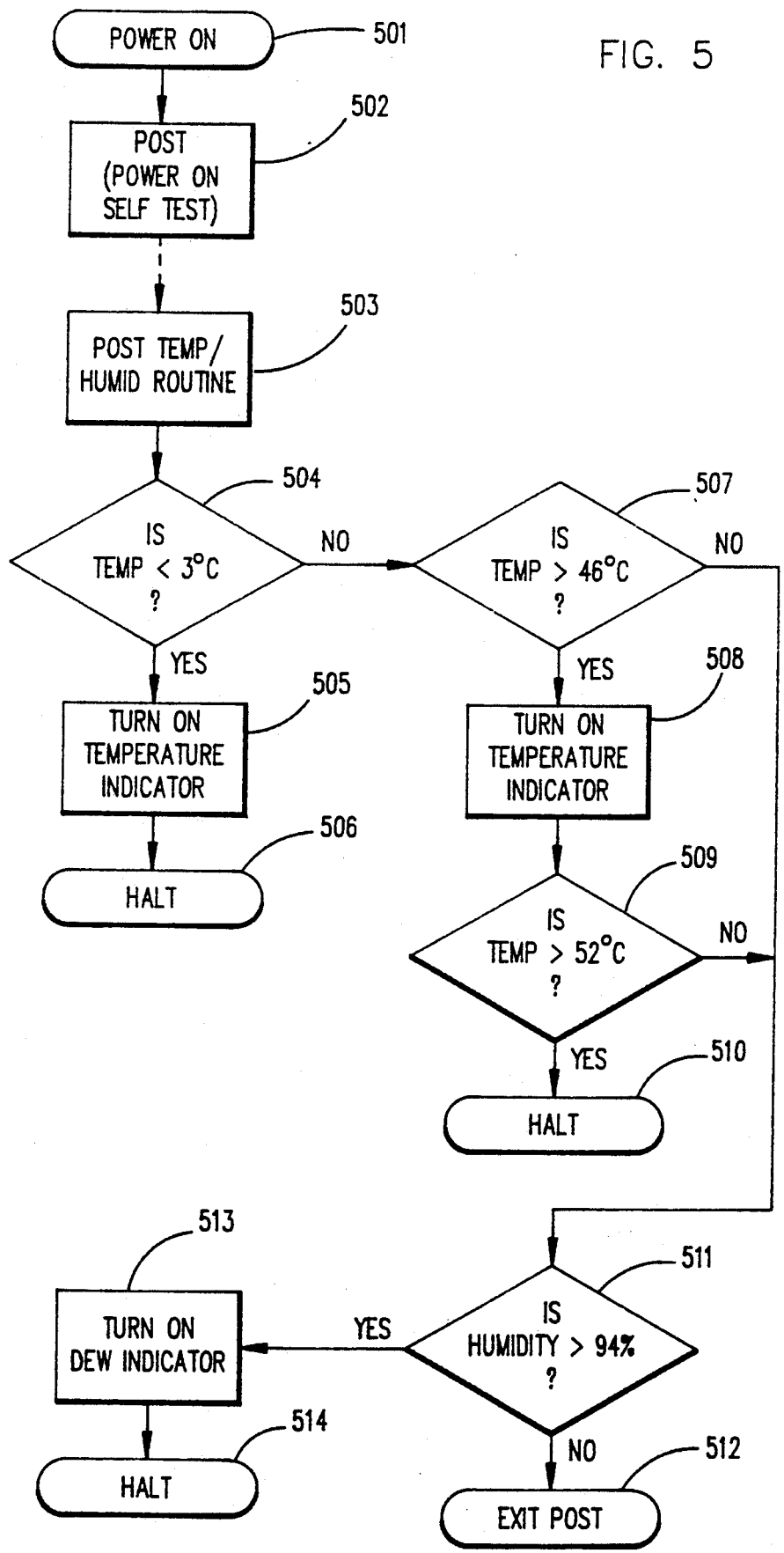
FIG. 5 is a flow chart of the Power On Self Test (POST) Temperature and Humidity Routine.

FIG. 5 is a flow chart of the Power On Self Test (POST) Routine that is executed every time the computer is turned on. Referring to this figure, power is applied at 501 and in first step 502, the computer executes well known self-testing routines such as memory test. After completing these well known tests, the program branches to step 503 which begins the temperature humidity routine. In the first step of 504 of the POST Temperature Humidity Routine, the ambient temperature is sampled. This temperature data comes from the A/D converter in microcontroller 30, which digitizes the analog signal coming from the interface circuit 38-1. If the temperature is less than 3 degrees C., the program branches to step 505 where a visual temperature indicator is activated. This temperature indicator is preferably a liquid crystal display that includes the International Standards Organization (ISO) symbol used to indicate that temperature is out of range. In next step 506, the computer is halted. The only way to recover from a halt is to reboot the computer. Of course the temperature of the environment must be raised above 3 degrees C. before the computer is rebooted, otherwise the same sequence of steps will be executed and the computer will, again, halt at step 506.

Returning to step 504, if the temperature is above 3 degrees C., the program branches to step 507 wherein the temperature is sampled again. If the temperature is greater than 46 degrees C., the temperature indicator is activated in step 508, but the unit is not at this particular time, brought to a halt. In next step 509, the temperature is sampled again. If the temperature is greater than 52 degrees C., the program is halted in next step 510. As in step 506, the only way to recover from a halt is to reboot the computer. Of course, the temperature must drop below 52 degrees C. before the computer will reboot, otherwise the same path through the flow chart will be taken. Returning to step 509, if the temperature is less than 52 degrees C., then the program branches to step 511 wherein the relative humidity is checked. Similarly, in step 507, if the temperature is less than 46 degrees, the program also branches to step 511. Thus, it can be seen from FIG. 5 that the temperature indicator is activated if the temperature is above 46 degrees C., but the computer is not halted until the temperature exceeds 52 degrees C. This provides a warning to the operator that he or she is already operating in a very warm environment, and that the heat generated in the computer itself could potentially raise the ambient temperature in and around the computer above the 52 degree limit.

In step 511, the relative humidity is sampled. If the relative humidity is below 96 percent, the program branches to step 512 to complete POST. In the alternative, if the POST Temperature Humidity Routine were embedded in post rather than being positioned at the very end, step 512 would merely return the program to POST. Returning to step 511, if the relative humidity is greater than 96 percent, the program branches to step 513, wherein the dew indicator is activated. Preferably, the dew indicator is an LCD that includes a standard ISO symbol for high relative humidity. After activating the dew indicator in 513, the program branches to step 514 wherein the program is halted. As in steps 506 and 510, the only way to recover from halt 514 is to reboot the computer. Obviously, when the computer is rebooted the relative humidity must be below 96 percent, otherwise the same path through the POST Temperature Humidity Routine will be executed again, and the program halted at step 514.

Figure 6:
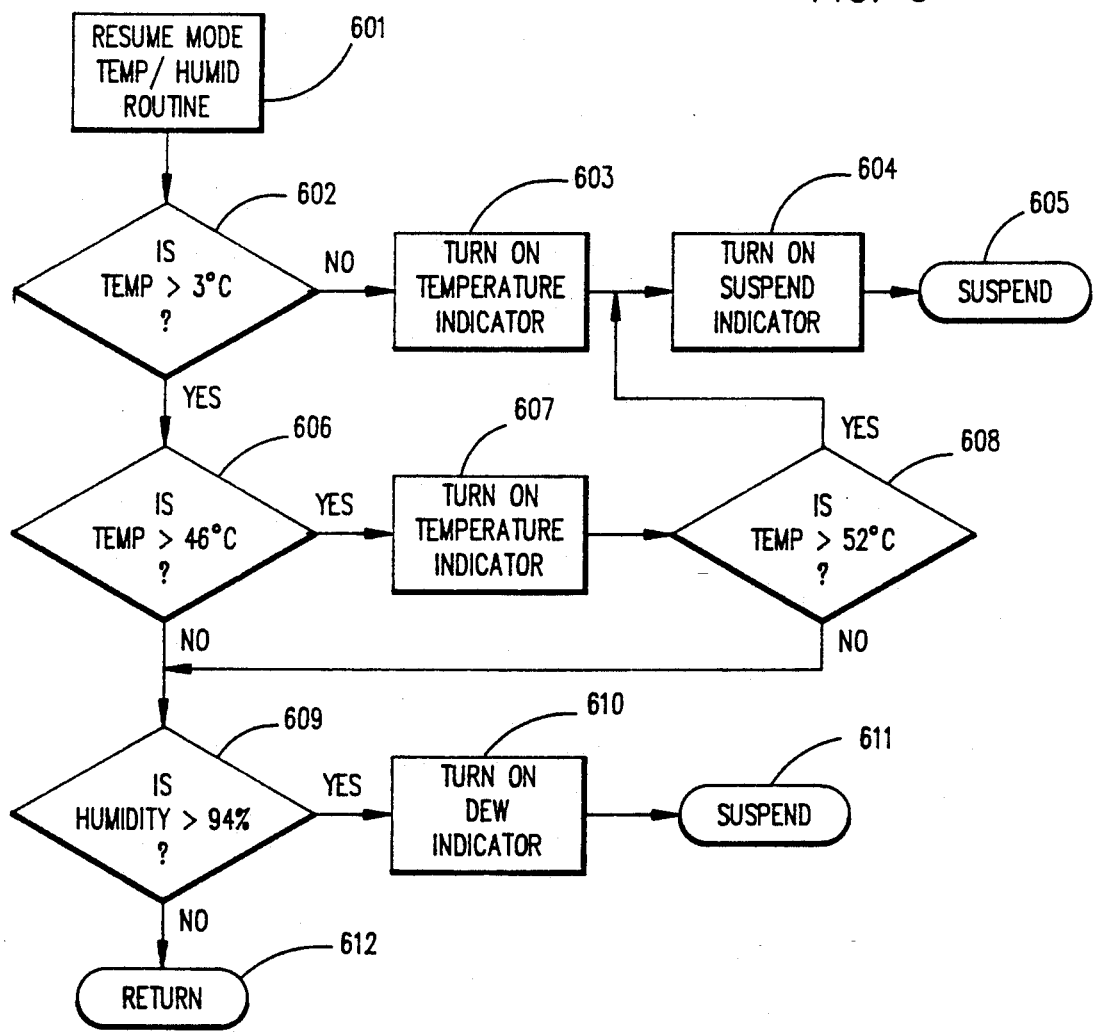
FIG. 6 is a flow chart of the Resume Mode Temperature and Humidity Routine.

FIG. 6 is a flow chart of the Resume Mode Temperature Humidity Routine which starts at block 601. When the computer is operational, it is considered to be in resume mode. The Resume Mode Temperature Humidity Routine is an interrupt driven routine that is executed on a periodic basis. These interrupts are activated by a timer in microcontroller 30. In first step 602, the temperature is sampled. If the temperature is less than 3 degrees C., the program branches to step 603 wherein the temperature indicator is activated. In next step 604, the suspend indicator is activated. The suspend indicator is, preferably, an LCD display that includes a standard ISO symbol indicating suspension of operation. In next step 605, the computer enters a suspend mode. This suspend mode is more fully described in the copending application entitled "Battery Operated Computer Power Management System". Briefly, in the suspend mode the computer enters a very low power mode and the computer is inoperable; however, upon resuming operations from the suspend mode the application program running at the time of the suspension is resumed at the same point that the suspension occurred. Thus, no data is lost. The return from suspend mode to resume mode is more fully described in conjunction with FIGS. 7A–7B.

Returning to step 602, if the temperature is greater than 3 degrees C., the program branches to step 606. If the temperature is greater than 46 degrees C., the program branches to step 607 wherein the temperature indicator is activated and then, the program branches to step 608. If the temperature is greater than 52 degrees C., the program branches to step 604 wherein the suspend indicator is activated and computer operations are suspended in the following step 605. Returning to step 608, if the temperature is less than 52 degrees C., the program branches to step 609 wherein the relative humidity is sampled. Similarly, in step 606, if the temperature is less than 46 degrees C., the program also branches to step 609. If the relative humidity is greater than 96 percent, the program branches to step 610 wherein the dew indicator is activated. Following activation of the dew activator, the computer is placed in the suspend mode in step 611. This suspend mode is substantially identical to the suspend mode activated by step 605. Returning to step 609, if the relative humidity is less than 96 percent, the program branches to step 612, which completes the interrupt routine.

Figure 7A:
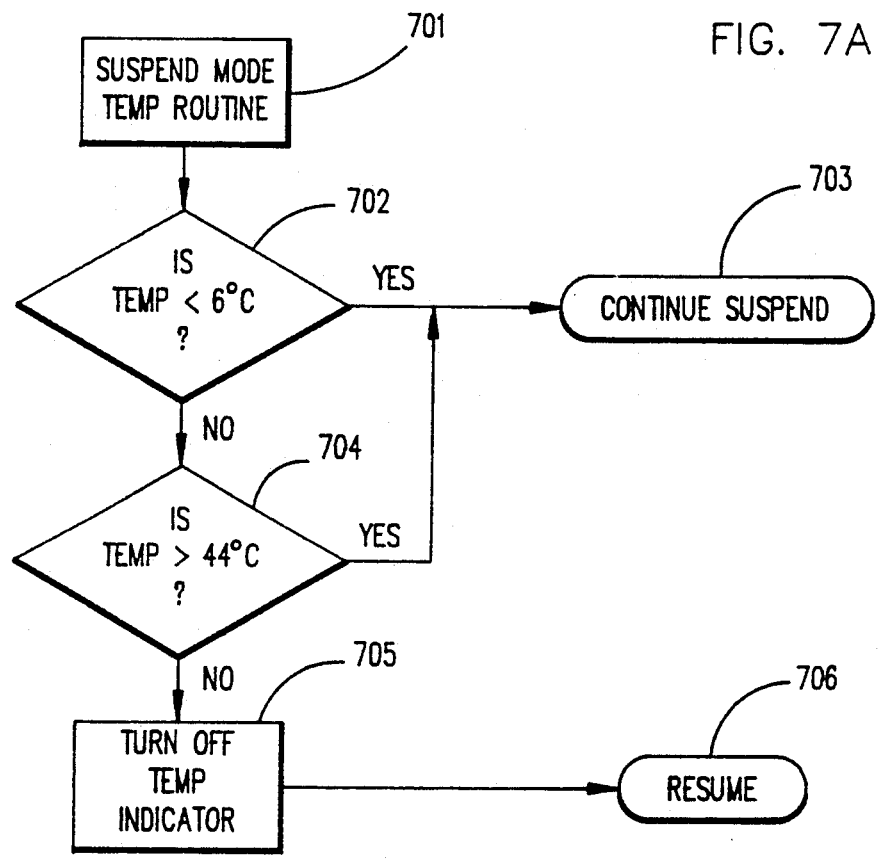
FIGS. 7A-7B are flow charts of the Suspend Mode Temperature Routine and Suspend Mode Humidity Routines, respectively.

FIG. 7A is a flow chart of the Suspend Mode Temperature Routine. If computer operations were suspended due to the ambient temperature being out of range, i.e.; if the suspend mode was entered by executing step 605 in FIG. 6, a flag is set indicating that suspension occurred because of over or under temperature. In that event, the Suspend Mode Routine of Figure of 7A is executed periodically while the main computer operations have been suspended. Block 701 indicates the starting point of the Suspend Mode Temperature Routine and, in first step 702 the ambient temperature is sampled. If the ambient temperature is below 6 degrees C., the program branches to step 703 which continues suspend mode. Returning to step 702, if the temperature is less than 6 degrees C., the program branches to step 704. If the temperature is greater than 44 degrees C., the program branches back to step 703 and suspend mode is continued. If, however, the temperature is less than 44 degrees C., the program branches to step 705 wherein the temperature indicator is deactivated. In next step 706, the program switches from suspend mode to resume mode.

Figure 7B:
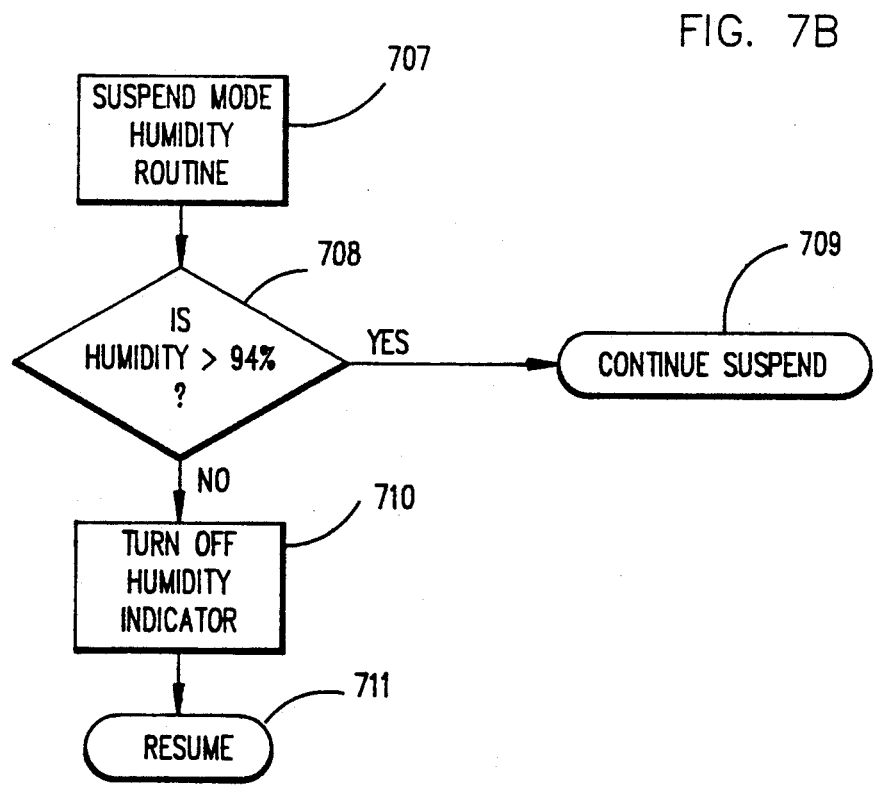

FIG. 7B is a flow chart of the Suspend Mode Humidity Routine. If computer operations were suspended because of excessive humidity, a flag is set in step 611 of FIG. 6. Subsequently, while the computer is in the suspension mode, the Suspend Humidity Routine 707 is periodically executed. In step 708, the humidity is measured and, if the humidity is greater than 87 percent, suspend mode is continued in step 709. If, however, the humidity has dropped below 87 percent, step 710 is executed wherein the humidity indicator is deactivated. In next step 711, the program switches from suspend mode to resume mode.

We claim as our invention:

1. Environmental protection circuitry for a computer, comprising in combination:
   temperature measuring means for measuring ambient temperature;
   means for switching said computer into a suspend mode in response to an ambient temperature measurement below a first predetermined temperature, and in response to an ambient temperature measurement above a second predetermined temperature; and
   means for switching said computer from said suspend mode to a resume mode in response to an ambient temperature measurement above a third predetermined temperature, and in response to an ambient temperature measurement below a fourth predetermined temperature.

2. The environmental protection circuitry of claim 1, further comprising:
   temperature indicating means for indicating temperature extremes;
   means for activating said temperature indicating means in response to an ambient temperature measurement below said first predetermined temperature, and in response to an ambient temperature measurement above said second predetermined temperature; and
   means for deactivating said temperature indicating means in response to an ambient temperature measurement above said third predetermined temperature, and in response to an ambient temperature measurement below said fourth predetermined temperature.

3. The environmental protection circuitry of claim 2, further comprising:
   means for activating said temperature indicating means in response to an ambient temperature measurement above a fifth predetermined temperature.

4. The environmental protection circuitry of claim 1, further comprising:
   humidity measuring means for measuring ambient relative humidity;
   means for switching said computer into said suspend mode in response to an ambient measurement above a first predetermined relative humidity; and
   means for switching said computer rom said suspend mode to said resume mode in response to an ambient humidity measurement below a second predetermined relative humidity.

5. The environmental protection circuitry of claim 4, further comprising:
   humidity indicating means for indicating high ambient relative humidity; and
   means for activating said humidity indicating means in response to an ambient humidity measurement above said first predetermined relative humidity; and
   means for deactivating said humidity indicating means in response to an ambient humidity measurement below said second predetermined relative humidity.

6. An environmental protection circuit for a computer, comprising in combination:
   humidity measuring means for measuring ambient relative humidity;
   means for switching said computer into a suspend mode in response to an ambient humidity measurement above a first predetermined relative humidity; and
   means for switching said computer from said suspend mode to a resume mode in response to an ambient humidity measurement below a second predetermined relative humidity.

7. The environmental protection circuit of claim 6, further comprising:
   humidity indicating means for indicating high ambient relative humidity; and
   means for activating said humidity indicating means in response to an ambient humidity measurement above said first predetermined relative humidity; and
   means for deactivating said humidity indicating means in response to an ambient humidity measurement below said second predetermined relative humidity.

8. A computer, comprising in combination:

a central processing unit;

means for visually displaying data processed in said computer;

semiconductor memory means for storing data;

magnetic storage means for storing data;

an address/data bus interconnecting said central processing unit, said means for visually displaying data, said semiconductor memory means, and said magnetic storage means;

temperature measuring means for measuring ambient temperature;

first interface circuitry coupled between said temperature measuring means and said address/data bus;

means for switching said computer into a suspend mode in response to an ambient temperature measurement below a first predetermined temperature, and in response to an ambient temperature measurement above a second predetermined temperature;

means for switching said computer from said suspend mode to a resume mode in response to an ambient temperature measurement above a third predetermined temperature, and in response to an ambient temperature measurement below a fourth predetermined temperature; and power supply means for supplying electrical power to said computer.

9. The computer of claim 8, further comprising:

temperature indicating means or indicating temperature extremes;

means for activating said temperature indicating means in response to an ambient temperature measurement below said first predetermined temperature, and in response to an ambient temperature measurement above said second predetermined temperature; and means or deactivating said temperature indicating means in response to an ambient temperature measurement above said third predetermined temperature, and in response to an ambient temperature measurement below said fourth predetermined temperature.

10. The computer of claim 9, further comprising:

means for activating said temperature indicating means in response to an ambient temperature measurement above a fifth predetermined temperature.

11. The computer of claim 8, further comprising:

humidity measuring means for measuring ambient relative humidity;

second interface circuitry coupled between said humidity measuring means and said address/data bus;

means for switching said computer into said suspend mode in response to an ambient humidity measurement above a first predetermined relative humidity; and means for switching said computer from said suspend mode to said resume mode in response to an ambient humidity measurement below a second predetermined relative humidity.

12. The computer of claim 11, further comprising:

humidity indicating means for indicating high ambient relative humidity; and means for activating said humidity indicating means in response to an ambient humidity measurement above said first predetermined relative humidity; and means for deactivating said humidity indicating means in response to an ambient humidity measurement below said second predetermined relative humidity.

* * * * *